(No Model.)
F. C. STARKE & P. J. CROWLEY.
STEAM SHOVEL.
No. 263,986. Patented Sept. 5, 1882.
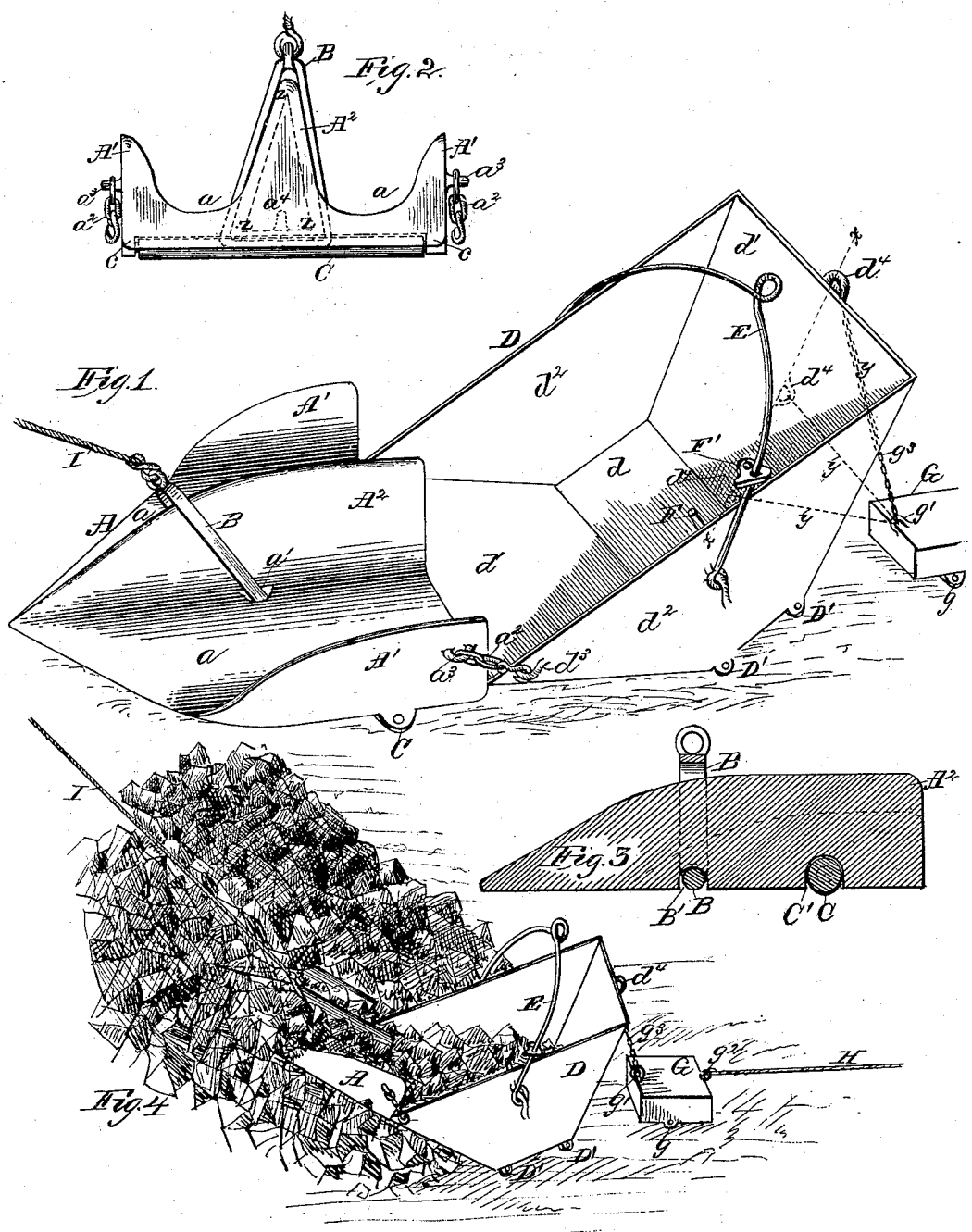
Witnesses:
E. G. Asmus
Carl Pickhardt.
Inventors:
Fredrick C. Starke
Peter J. Crowley
by Stout & Underwood
Attorneys.

UNITED STATES PATENT OFFICE.

FREDRICK C. STARKE AND PETER J. CROWLEY, OF MILWAUKEE, WIS.

STEAM-SHOVEL.

SPECIFICATION forming part of Letters Patent No. 263,986, dated September 5, 1882.

Application filed June 24, 1882. (No model.)

*To all whom it may concern:*

Be it known that we, FREDRICK C. STARKE and PETER J. CROWLEY, of Milwaukee, in the county of Milwaukee, and in the State of Wisconsin, have invented certain new and useful Improvements in Steam-Shovels; and we do hereby declare that the following is a full, clear, and exact description thereof.

Our invention relates to shovels actuated by steam, and designed especially for use in connection with coal, iron ore, and other materials, and will be more particularly set forth hereinafter.

In the drawings, Figure 1 represents in perspective our entire device. Fig. 2 is a rear elevation, and Fig. 3 a central longitudinal section, of the shovel proper; and Fig. 4 represents our device in operation.

A is the shovel, made, as shown, with flat bottom and side flanges $A'$ $A'$, and a central flange or ridge, $A^2$, (the latter either solid or hollow, as desired,) which preferably rises higher than the side flanges, thus dividing the shovel into two passages or gutters, $a$ $a$.

B is the bail of the shovel, and its arms pass down on each side of the central flange, $A^2$, and through holes $a'$ $a'$ in the gutters $a$ $a$, being united beneath the bottom of the bail, resting within a groove, $B'$, countersunk in the bottom of the shovel, so as not to interfere with its plane surface.

When it is desired to use our shovel in mines or on the surface of the earth, a wholly smooth bottom is best; but when the coal or other material rests upon a floor or the deck of a vessel it will be found advantageous to add a roller under the rear end of the shovel. This roller (marked C) is preferably located partly within a transverse groove, $C'$, in the bottom of the shovel, as thereby a larger roller may be employed than if the said roller were wholly below the bottom surface. Lugs $c$ $c$, projecting downward from near the rear end of the shovel, afford bearing for the roller, and the effect of this arrangement will be to point the forward end of the shovel downward, while at the same time the roller will serve to safely carry the shovel over the tops of any bolts, spikes, or other irregularities in the said floor or deck, and the point of the shovel is preferably slightly beveled off or rounded on its under side, to further facilitate its passage over irregularities.

D is the bucket or receiver, made preferably with narrow transverse oblong bottom $d$, flaring ends $d'$ $d'$, and vertical sides $d^2$ $d^2$.

E represents the bucket-bail, connected to rings or loops on the outer surfaces of the side pieces, $d^2$, as shown.

F is a locking-pin projecting vertically from inside the bucket, parallel to one of the side pieces, $d^2$, to which it is attached. $F'$ is the locking plate or link, and is merely a piece of metal with two holes in it, one perforated part to encircle the arm of the bail E and the other to pass over the pin F, and thus lock the bail-arm and pin rigidly together in vertical position when it is desired to hoist the bucket. At or near the forward upper end of the bucket it is attached to the shovel. We have here shown the following construction, though it may be readily modified:

$d^3$ $d^3$ are loops or rings projecting from the side pieces, $d^2$ $d^2$, and connected by short chains and hooks $a^2$ $a^2$ to similar loops, $a^3$ $a^3$, projecting from about the rear ends of the flanges $A'$ $A'$ of the shovel. The bucket D may, if desired, be mounted upon rollers $D'$ $D'$, as shown.

G is a counterpoise, called the "governor," because its function is to govern the bucket or receiver. This part consists of a heavy weight or block of metal mounted upon a roller, $g$, as shown, and having rings or loops $g'$ and $g^2$ at its front and rear, respectively, for the attachment of chains or cables.

To the rear end piece, $d'$, of our bucket we attach one or more loops or rings, $d^4$ $d^4$. We prefer to make our bucket with three of these loops arranged in vertical central line $x$ $x$ at the top, middle, and near the bottom of the said flaring end piece, as shown in full and dotted lines in Fig. 1. To either one of these rings $d^4$ one end of a chain, $g^3$, is attached, (upon either of the dotted lines $y$ $y$ $y$,) the other end of said chain being secured to the forward ring $g'$ of the governor G, which is to be operated from another chain or cable, H, secured to the ring $g^2$ at the rear of said governor. Similarly a chain or cable, I, is attached to the ring at the top of the shovel-bail B, and thus, with the several parts of our device—shovel, bucket, and governor—connected together, as described, the forward or backward motion of the whole device may be governed by applying power to the cable I or to the cable H, as required.

The operation of our device will be readily understood from the foregoing description of its construction. Power being applied to the cable I, the shovel and attachments are drawn forward into the mass of coal, ore, or other material, filling the receiver, the governor meanwhile acting to prevent the bucket being upset. When the bucket is filled the motion is reversed and power applied to the cable H, which draws the whole back the required distance, so as to bring the bucket within reach of the operator, who detaches it from the shovel and governor and locks the bucket-bail in vertical position, as hereinbefore described, and then fastens the end of the hoisting-rope to the ring at the top of the bucket-bail, so that the bucket may be hoisted up, emptied, and lowered, and the shovel and governor reattached, ready for another forward movement. The whole action of our device is automatic, save only the detaching and attaching of its parts and the locking and unlocking of the bucket-bail, and all this can be accomplished by a single operator stationed at the lower hoisting-point, working in conjunction with the man above, who receives the bucket, discharges its contents, and returns it to the operator below.

It is apparent that under certain circumstances the bucket or receiver may be employed independently of the shovel or governor, or both, and we therefore desire it understood that we claim each part of our device as of our invention, as well as the whole in combination, in which condition it is ordinarily intended to work.

In Fig. 2 we have shown within the full lines representing the central flange, $A^2$, dotted lines $z\ z\ z$ to indicate that when desired this flange may be hollow (and open at the rear) instead of solid, thus reducing the weight and cost of the device. In place of attaching the shovel and bucket together by the side loops, $a^3$ and $d^3$, and side chains and hooks, $a^2$, we may dispense with these and place a hook, $a^4$, within the said hollow central flange, $A^2$, as shown in dotted lines in Fig. 2, to connect with a ring or eye on the end of a hinged rod projecting from the center of the upper end of the forward flaring end, $d'$, of the bucket, and suitably braced and secured within the bucket. The advantage of this construction would be economy of time and space required for detachment and attachment of these parts when working in narrow quarters, as on board of a vessel. The possible tendency of a hollow central flange to become clogged in its reverse movement (as by fine iron ore) may be overcome by cutting a hole entirely through the bottom of the shovel, communicating with the interior of the said flange; but these details are capable of variation in a variety of ways, and do not affect the essence of our invention.

Having thus described our invention, what we claim as new, and desire to secure by Letters Patent, is—

1. A steam-shovel having flat bottom and side and central flanges, as described, forming gutters between them, and provided with a bail for attachment of the cable which transmits power to the shovel, as set forth.

2. The combination of the shovel A, having flat bottom and side and central flanges, $A'$ $A'$ $A^2$, forming gutters $a\ a$ between them, with the bail B, passing over and around the central flange, $A^2$, and through the gutters $a\ a$, the bottom of said rail resting in a groove, $B'$, countersunk in the bottom of the shovel, all substantially as shown and described.

3. The combination of the shovel A, having flat bottom, with transverse grooves $B'$ and $C'$ and perforations $a'\ a'$, and side and central flanges, $A'\ A'\ A^2$, with the bail B, arranged as described, and the roller C, all substantially as shown and described, and for the purposes set forth.

4. The bucket D, having transverse oblong bottom $d$, flaring ends $d'\ d'$, and vertical sides $d^2\ d^2$, and provided with bail E, rollers $D'\ D'$, and loops or rings for attachment of the bucket to operating mechanism, substantially as shown and described.

5. The combination of the bucket D and bail E with the locking-pin F and locking-plate $F'$, as shown and described, and for the purpose set forth.

6. In a device for shoveling and removing coal, ore, &c., the governor G, consisting of a heavy block of metal mounted upon a roller, $g$, and provided with rings or loops $g'\ g^2$, for attachment of operating mechanism, all substantially as described.

7. In a device for shoveling and removing coal, ore, &c., the combination of the shovel A, bucket D, governor G, and connecting-chains, substantially as set forth.

8. In a device for shoveling and removing coal, ore, &c., the combination of the cable I, bail B, shovel A, bucket D, governor G, cable H, and connecting-chains, substantially as shown and described.

In testimony that we claim the foregoing we have hereunto set our hands on this 16th day of June, 1882, in the presence of two witnesses.

FREDRICK C. STARKE.
PETER J. CROWLEY.

Witnesses:
HAROLD G. UNDERWOOD,
CARL PICKHARDT.